(12) United States Patent
Koss et al.

(10) Patent No.: US 10,680,884 B2
(45) Date of Patent: *Jun. 9, 2020

(54) CONFIGURING WIRELESS DEVICES FOR A WIRELESS INFRASTRUCTURE NETWORK

(71) Applicant: Koss Corporation, Milwaukee, WI (US)

(72) Inventors: Michael J. Koss, Milwaukee, WI (US); Michael J. Pelland, Princeton, WI (US); Joel L. Haynie, DeForest, WI (US)

(73) Assignee: KOSS CORPORATION, Milwaukee, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 16/528,173

(22) Filed: Jul. 31, 2019

(65) Prior Publication Data
US 2019/0356544 A1    Nov. 21, 2019

Related U.S. Application Data

(63) Continuation of application No. 16/375,428, filed on Apr. 4, 2019, which is a continuation of application (Continued)

(51) Int. Cl.
*H04L 12/24* (2006.01)
*H04W 24/02* (2009.01)
(Continued)

(52) U.S. Cl.
CPC .......... *H04L 41/0806* (2013.01); *G06F 3/165* (2013.01); *H04L 61/2007* (2013.01);
(Continued)

(58) Field of Classification Search
CPC . H04L 41/0806; H04L 61/2007; H04L 67/12; H04L 67/125; H04L 67/42;
(Continued)

(56) References Cited

U.S. PATENT DOCUMENTS 8,190,203 B2    5/2012    Pelland et al.
8,320,410 B2    11/2012    Agren
(Continued)

FOREIGN PATENT DOCUMENTS

WO    WO 01/78443 A2    10/2001
WO    WO 2013/151878 A1    10/2013

OTHER PUBLICATIONS

Sony Corporation, Quick Start Guide, 2012, 4-295-602-31(1), China, (2 Pages).
(Continued)

*Primary Examiner* — Jae Y Lee

(57) ABSTRACT

Systems and methods permit a wireless audio output device to receive a content streaming preference that identifies a remote digital media content source. A mobile computing device transmits, wireless via an ad hoc wireless communication link, credential data for an infrastructure wireless network to the wireless audio output device. The wireless audio output device may then connect to a wireless access point via the infrastructure wireless network and receive the content streaming preference from a host server via the infrastructure network. Digital media content may then be streamed from the remote digital media content source according to the content streaming preference.

20 Claims, 5 Drawing Sheets

Related U.S. Application Data

No. 16/057,360, filed on Aug. 7, 2018, now Pat. No. 10,298,451, which is a continuation of application No. 15/927,262, filed on Mar. 21, 2018, now Pat. No. 10,079,717, which is a continuation of application No. 15/463,559, filed on Mar. 20, 2017, now Pat. No. 9,992,061, which is a continuation of application No. 15/080,940, filed on Mar. 25, 2016, now Pat. No. 9,629,190, which is a continuation of application No. 14/850,508, filed on Sep. 10, 2015, now Pat. No. 9,326,304, which is a continuation of application No. 14/702,316, filed on May 1, 2015, now Pat. No. 9,185,168, which is a continuation of application No. 13/832,719, filed on Mar. 15, 2013, now Pat. No. 9,060,288.

(51) Int. Cl.

| | | |
|---|---|---|
| H04L 29/08 | (2006.01) | |
| H04L 29/12 | (2006.01) | |
| H04W 8/00 | (2009.01) | |
| H04W 8/26 | (2009.01) | |
| H04W 76/11 | (2018.01) | |
| H04W 12/08 | (2009.01) | |
| H04W 76/10 | (2018.01) | |
| G06F 3/16 | (2006.01) | |
| H04W 72/04 | (2009.01) | |
| H04W 84/18 | (2009.01) | |
| H04L 29/06 | (2006.01) | |

(52) U.S. Cl.
CPC ............ *H04L 67/12* (2013.01); *H04L 67/125* (2013.01); *H04W 8/005* (2013.01); *H04W 8/26* (2013.01); *H04W 12/08* (2013.01); *H04W 24/02* (2013.01); *H04W 72/04* (2013.01); *H04W 76/10* (2018.02); *H04W 76/11* (2018.02); *H04L 67/42* (2013.01); *H04W 84/18* (2013.01)

(58) Field of Classification Search
CPC ..... H04W 76/11; H04W 76/10; H04W 8/005; H04W 8/26; H04W 12/08; H04W 24/02; H04W 72/04; H04W 84/18; G06F 3/165
See application file for complete search history.

(56) References Cited

U.S. PATENT DOCUMENTS

| 8,336,080 B2 | 12/2012 | Herrod |
| 8,549,600 B2 | 10/2013 | Shedrinsky |
| 8,818,276 B2 | 8/2014 | Kiukkonen et al. |
| 9,002,044 B2 | 4/2015 | Dinescu et al. |
| 9,060,288 B2 | 6/2015 | Pelland et al. |
| 9,185,168 B2 | 11/2015 | Pelland et al. |
| 9,326,304 B2 | 4/2016 | Pelland et al. |
| 9,629,190 B1 | 4/2017 | Koss et al. |
| 10,079,717 B2* | 9/2018 | Koss ............... H04W 8/005 |
| 10,298,451 B1* | 5/2019 | Koss ............... H04L 67/125 |
| 2004/0204743 A1 | 10/2004 | McGrath et al. |
| 2007/0086394 A1 | 4/2007 | Yamada et al. |
| 2009/0249459 A1* | 10/2009 | Coughlin ............ H04L 63/08 726/7 |
| 2009/0315708 A1 | 12/2009 | Walley et al. |
| 2010/0081375 A1 | 4/2010 | Rosenblatt et al. |
| 2010/0115262 A1* | 5/2010 | Suyama ............ H04L 63/06 713/150 |
| 2011/0103609 A1* | 5/2011 | Pelland ............ H04R 1/1041 381/74 |
| 2013/0014232 A1* | 1/2013 | Louboutin ........ H04M 1/72527 726/5 |
| 2013/0084835 A1* | 4/2013 | Scherzer ............ H04W 48/14 455/414.1 |
| 2013/0254692 A1* | 9/2013 | Han ............... G06F 3/0486 715/769 |
| 2013/0266152 A1 | 10/2013 | Haynie et al. |
| 2013/0309971 A1* | 11/2013 | Kiukkonen ........ H04W 12/003 455/41.2 |
| 2014/0064511 A1 | 3/2014 | Desai |
| 2014/0233545 A1 | 8/2014 | Ferguson-Jarnes et al. |
| 2014/0279122 A1 | 9/2014 | Luna et al. |
| 2015/0135208 A1* | 5/2015 | Itagaki ............ H04N 21/4821 725/25 |
| 2017/0195175 A1 | 7/2017 | Koss et al. |
| 2019/0229988 A1* | 7/2019 | Koss ............... H04L 41/0806 |

OTHER PUBLICATIONS

Rosenberg, et al., Standards Track, SIP: Session Initiation Protocol, Jun. 2002, pp. 1-269, RFC 3261, The Internet Society; (269 Pages).
Sony Corporation, Network Speaker Operating Instructions, 2012, pp. 1-60, SA-NS500, 4-295-601-31(1), China, http://www.sony.net/sans; (60 Pages).
Sony Electronics Inc., Sony Wireless Network Speakers, 2011, (2 Pages).
WiFi Alliance, Wi-Fi Protected Setup Specification, Version 1.0h, Dec. 2006, pp. 1-110, (110 Pages).
Brodnick, M., "Review—Koss Striva could be the next big platform to enjoy music," http://www.brightsideofnews.com/2012/05/14/review-koss-striva-could-be-the-next-big-platform-to-enjoy-music/, May 14, 2012.
Robson, W., "Koss STRIVA MyKoss Wi-Fi Streaming—Tips and Tricks," http://www.audioholics.com/headphone-reviews/koss-striva-pro-wi-fi-headphone-review/mykoss-wi-fi-streaming-2013-tips-and-tricks/, Jul. 3, 2012.
Robson, W., "Interview: Michael J. Koss Introduces STRIVA Wi-Fi Headphones," http://www.audioholics.com/editorials/michael-j.-koss-striva/, Jun. 7, 2012.

* cited by examiner

CONFIGURING WIRELESS DEVICES FOR A WIRELESS INFRASTRUCTURE NETWORK

PRIORITY CLAIM

The present application claims priority under 35 U.S.C. § 120 as a continuation application to U.S. nonprovisional patent application Ser. No. 16/375,428, filed Apr. 4, 2019, which is a continuation of U.S. nonprovisional patent application Ser. No. 16/057,360, filed Aug. 7, 2018, now U.S. Pat. No. 10,298,451 issued May 21, 2019, which is a continuation of U.S. nonprovisional patent application Ser. No. 15/927,262, filed Mar. 21, 2018, now U.S. Pat. No. 10,079,717 issued Sep. 18, 2018, which is a continuation of U.S. nonprovisional patent application Ser. No. 15/463,559, filed Mar. 20, 2017, now U.S. Pat. No. 9,992,061, issued Jun. 5, 2018, which is a continuation of U.S. nonprovisional patent application Ser. No. 15/080,940, filed Mar. 25, 2016, now U.S. Pat. No. 9,629,190, issued Apr. 18, 2017, which is a continuation of U.S. nonprovisional patent application Ser. No. 14/850,508, filed Sep. 10, 2015, now U.S. Pat. No. 9,326,304, issued Apr. 26, 2016, which is a continuation of U.S. nonprovisional patent application Ser. No. 14/702,316, filed May 1, 2015, now U.S. Pat. No. 9,185,168, issued Nov. 10, 2015, which is a continuation of U.S. nonprovisional patent application Ser. No. 13/832,719, filed Mar. 15, 2013, now U.S. Pat. No. 9,060,288, issued Jun. 16, 2015, all of which are incorporated herein by reference in their entirety.

BACKGROUND

Wireless earphones that stream digital-audio content from sources are known. For example, U.S. Pat. No. 8,190,203, which is incorporated herein by reference in its entirety, describes a wireless earphone pair where each earphone is capable of receiving and playing digital-audio streamed over ad-hoc or infrastructure Wi-Fi networks. This patent also describes that the source of the digital-audio content could be a wireless network adapter that plugs into an audio player (such as a personal digital audio player (DAP)) and transmits the audio from the audio player to the earphones via a Wi-Fi ad hoc network. Also, the earphones may connect to, and stream digital-audio content from, a remote server through the Internet via an infrastructure Wi-Fi network.

SUMMARY

In various embodiments, the present invention is directed to systems and methods for configuring a wireless device to receive data wirelessly via an infrastructure wireless network, without physically connecting the wireless device to a computer in order to configure it, and without having a have an existing infrastructure wireless network for the wireless device to connect to. The wireless device could be for example a wireless media player (such as an audio player or a video player), a wireless controller for electronic equipment, or any device that receives wireless data.

According to various embodiments, a system according to the present invention comprises: the wireless device configured to receive data wirelessly; a content access point that communicates with the wireless device via an ad hoc wireless network; a computer that is connectable to the content access point; and a remote server in communication with the computer via a communications network (e.g., the Internet). The remote server hosts a website, accessible by the computer, through which a user of the wireless device inputs, via the computer, credential data for at least one infrastructure wireless network, and the remote server stores the credential data. Also, the content access point transmits the credential data for the at least one infrastructure wireless network to the wireless device via the ad hoc wireless network, such that, upon receipt of the credential data for the at least one infrastructure wireless network, the wireless device is configured to connect to the at least one infrastructure wireless network. That way, the wireless device can connect to the infrastructure wireless network without having to have been plugged into the computer, and without having to have been connected to another, different infrastructure wireless network.

In another general aspect, the present invention is directed to a method of configuring a wireless media player to communicate via an infrastructure wireless network. In various implementations, the method comprises, prior to connecting the wireless media player to the infrastructure wireless network, the steps of: storing an IP address for the wireless media player in a non-volatile memory of a separate content access point device; connecting the content access point device to a computer that is configured to communicate with a remote server via the Internet; uploading the IP address for the wireless media player stored in the non-volatile memory of the content access point device to the remote server from the computer and the Internet; receiving by the remote server credential data for the infrastructure wireless network from a user; and transmitting, by the content access point, the credential data for the infrastructure wireless network to the wireless media player via an ad hoc wireless network between the content access point device and the wireless media player. The inventive method further comprises, after the wireless media player receives the credential data for the infrastructure wireless network from the content access point device via the ad hoc wireless network, the step of the wireless media player connecting to the infrastructure wireless network using the received credential data for the infrastructure wireless network.

These and other benefits and aspects of the present invention are described below.

BRIEF DESCRIPTION OF THE FIGURES

Various embodiments of the present invention are described herein by way of example in conjunction with the following figures, wherein.

DESCRIPTION

Various embodiments of the present invention are directed to systems and methods for configuring a wireless device to communicate via an infrastructure wireless network, such as an infrastructure Wi-Fi network, without having to physically plug the wireless device into a computer to configure it, and without having to have an existing infrastructure wireless connection for the wireless device. In the description to follow, the wireless device is usually described as a wireless audio player, e.g., a set of earphones, although it should be recognized that the present invention is not so limited. The wireless device could be another type of media player, such as a wireless video player, or another type of device that receives data wirelessly. For example, the wireless device could be a controller for electronic equipment, such as a controller for lighting systems, cameras, machinery, gaming equipment, etc., that receives control data via a wireless communication link.

Figure 1:
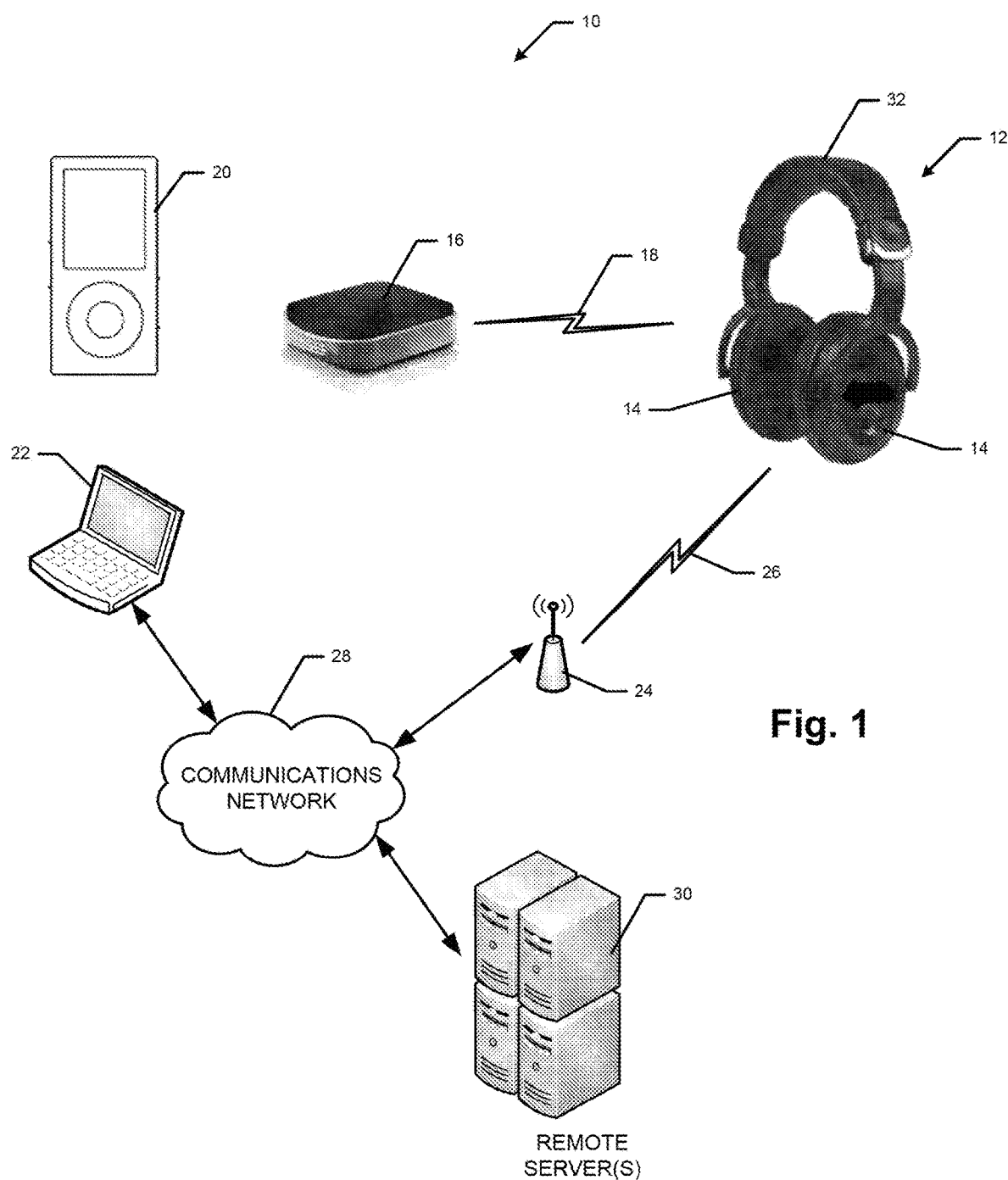
FIGS. 1, 4 and 5 are diagrams of systems according to various embodiments of the present invention.

FIG. 1 is a diagram of a system 10 according to various embodiments of the present invention. The system 10 comprises an earphone set 12 comprising a pair of earphones 14, one for each ear of a user. One or both of the earphones 14 may communicate wirelessly with a content access point (CAP) 16 via an ad hoc communication link 18, which is preferably an ad hoc Wi-Fi link (e.g., IEEE 802.11a/b/g/n), although in other embodiments different wireless communication protocols may be used, such as WiMAX (IEEE 802.16), Bluetooth, Zigbee, UWB, etc. The ad hoc communication link 18 is an ad hoc wireless network because it is a point-to-point network (in this case, the CAP 16 to the wireless device 14) that does not utilize preexisting infrastructure, such as wireless access points. In such an ad hoc network, the devices (e.g., the CAP 16 and the wireless device 14) may have equal status on the network.

The CAP 16 is connectable, through, for example, a wired connection, to a source of digital audio that stores and plays digital audio files, such as MP3, FLAC, etc. files. The source may be, as shown in FIG. 1, a personal DAP 20 or a computer 22, for example, although in other embodiments other media source devices may be used. The personal DAP 20 may be a personal MP3 player, iPod, iPhone, etc., or any other personal electronic device capable of storing and playing digital audio files. The computer 22 may be any suitable computer device, such as a personal computer, laptop computer, tablet computer, smart phone, etc., and preferably has a browser to facilitate initializing the CAP 16 and earphones 14, as described further below. The CAP 16 may connect to the DAP 20 via a USB connector (not shown) that connects to a USB port (e.g., conventional, mini, and micro) of the CAP 16 and to an audio jack on the DAP 20, such as a 3.5 mm TRS or TRRS audio jack. The CAP 16 may connect to the computer 22 via a USB connection (not shown). Also, the CAP 16 may be an integral part of the DAP 20 or the computer 22. As shown in FIG. 1, the earphones 14 may also connect to a wireless access point 24 via a wireless infrastructure communication link 26, that is again preferably a Wi-Fi link, although other wireless protocols could be used. The wireless infrastructure communication link 26 may be part of an infrastructure wireless network because it utilizes a wireless access point 24 and connects to an Internet service provider (e.g., a Wi-Fi hotspot).

Both the computer 22 and the wireless access point 24 may be connected to a communications network 28, which is preferably an electronic, packet-switched, data communications network, such as a TCP/IP network, such as the Internet. Numerous servers are connected to the Internet; one remote server system 30 is shown in FIG. 1. As described further below, a user may connect to the remote server system 30 to provision or initialize the user's CAP 16 and earphones 14 for initial use, and to otherwise manage the CAP 16 and earphones 14. The remote server system 30 may also stream digital audio content to the earphones 14 via the infrastructure wireless network 26, although the earphones 14 may also stream digital content from other servers connected to the communications network 28 once configured to communicate via the infrastructure wireless network 26, as described below.

In FIG. 1, the earphone set 12 includes a headband 32 connecting the earphones 14. In such an embodiment, one earphone 14 may receive the wireless digital content and transmit it to the other earphone 14 for synchronized playing via a wire that runs through the head band to connect the earphones 14. In other embodiments, both earphones 14 may receive wirelessly and play synchronously the streaming digital content. In such an embodiment, a headband between the earphones is not necessary. More details regarding such wireless earphone pairs are described in the following patents and patent applications, which are incorporated herein by reference in their entirety: U.S. Pat. No. 8,190,203; U.S. Pub. No. 2012/0230510 A1; and U.S. nonprovisional application Ser. No. 13/441,476, filed Apr. 6, 2012, now Pub. No. 2013/0266152. These patents and patent applications also include simplified block diagrams of the earphones 14 according to various embodiments. As disclosed in these patents and patent applications, the earphones 14 have one or more acoustic transducers for producing sound.

Figure 2:
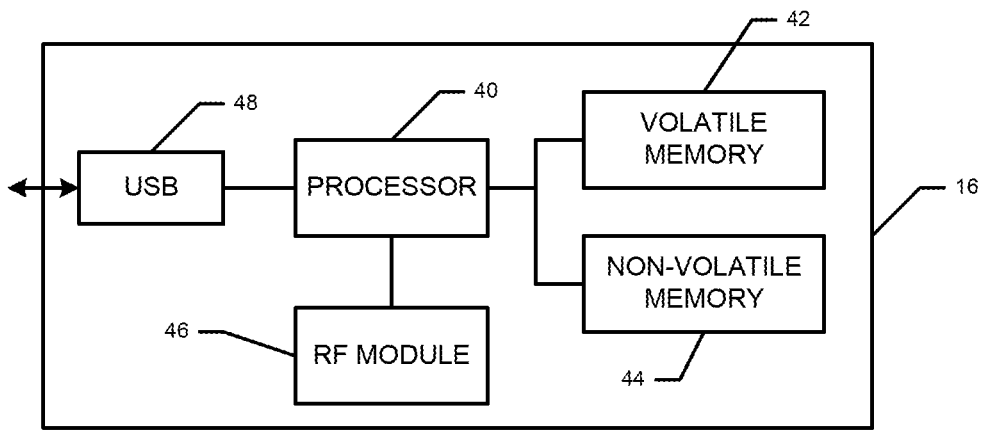
FIG. 2 is simplified block diagram of the content access point and FIG. 2A is a simplified block diagram of an earphone according to various embodiments of the present invention.
Figure 2A:
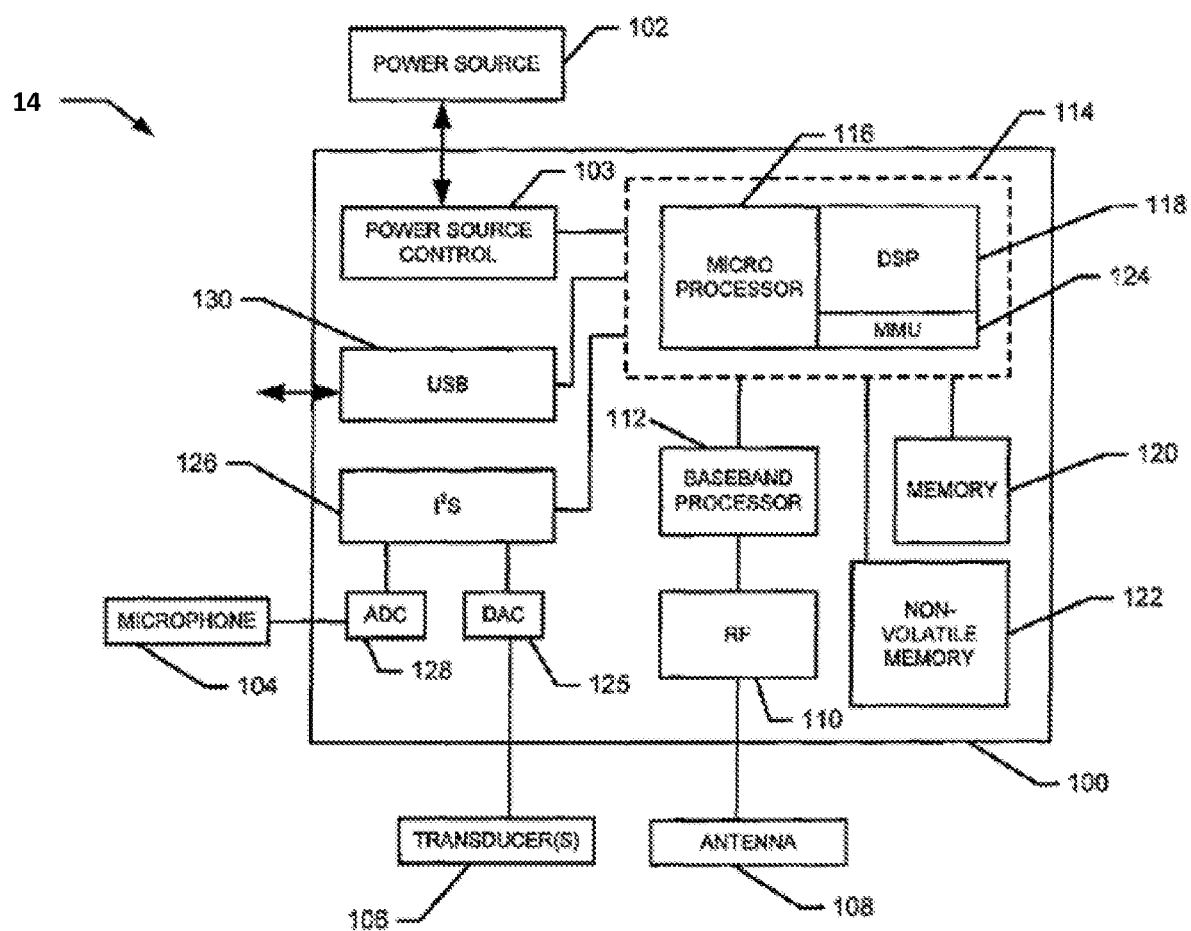

For example, as shown in FIG. 2A, which shows a block diagram for one of the earphones 14 of the earphone set 12 according to one embodiment, the earphone 10 comprises a transceiver circuit 100 and related peripheral components. As shown in FIG. 2A, the peripheral components of the earphone 10 may comprise a power source 102, a microphone 104, one or more acoustic transducers 106 (e.g., speakers), and an antenna 108. The transceiver circuit 100 and some of the peripheral components (such as the power source 102 and the acoustic transducers 106) may be housed within the body of the earphone 14. Other peripheral components, such as the microphone 104 and the antenna 108 may be external to the body 12 of the earphone 10. For embodiments having more than one transducer, one transducer may be larger than the other transducer, and a crossover circuit may transmit the higher frequencies to the smaller transducer and may transmit the lower frequencies to the larger transducer.

A RF (e.g., Wi-Fi) module 110 of the transceiver circuit 100 in communication with the antenna 108 may, among other things, modulate and demodulate the signals transmitted from and received by the antenna 108. The RF module 110 communicates with a baseband processor 112, which performs other functions necessary for the earphone 10 to communicate using the Wi-Fi (or other communication) protocol. The baseband processor 112 may be in communication with a processor unit 114, which may comprise a microprocessor 116 and a digital signal processor (DSP) 118. The microprocessor 116 may control the various components of the transceiver circuit 100. The DSP 114 may, for example, perform various sound quality enhancements to the digital audio received by the baseband processor 112, including noise cancellation and sound equalization. The processor unit 114 may be in communication with a volatile memory unit 120 and a non-volatile memory unit 122. A memory management unit 124 may control the processor unit's access to the memory units 120, 122. The volatile memory 122 may comprise, for example, a random access memory (RAM) circuit. The non-volatile memory unit 122 may comprise a read only memory (ROM) and/or flash memory circuits. The memory units 120, 122 may store firmware that is executed by the processor unit 114. Execution of the firmware by the processor unit 114 may provide various functionality for the earphone 10, such as the automatic transition between wireless networks as described herein. The memory units 120, 122 may also cache received digital audio. A digital-to-analog converter (DAC) 125 may convert the digital audio from the processor unit 114 to analog form for coupling to the acoustic transducer(s) 106. An I²S interface 126 or other suitable serial or parallel bus interface may provide the interface between the processor unit 114 and the DAC 125. An analog-to-digital converter (ADC) 128, which also communicates with the I²S interface 126, may convert analog audio signals picked up by the microphone 104 for processing by the processor unit 114. The transceiver circuit 100 also may comprise a USB or other suitable interface 130 that allows the earphone 10 to be connected to an external device via a USB cable or other suitable link. As shown in FIG. 4A, the external device may be a docking station 200 connected to a computer device 202. Also, in various embodiments, the earphone 10 could be connected directly to the computer 202 without the docking station 200. In addition, the external device may be a DAP 210, as shown in FIG. 4B. In that way, the earphone 10 could connect directly to a data source 20, such as the DAP 210 or the computer 202, through the USB port 130. In addition, through the USB port 130, the earphone 10 may connect to a PC 202 or docking station 202 to charge up the power source 102 and/or to get downloads (e.g., data or firmware).

FIG. 2 is simplified block diagram of the CAP 16 according to various embodiments of the present invention. As shown in FIG. 2, the CAP 16 may comprise a processor 40, a volatile memory 42, a nonvolatile memory 44, a RF (or radio or Wi-Fi) module 46 and a USB port 48 or other suitable external interface that allows the CAP 16 to connect to an external device, such as the DAP 20 or the computer 22. The CAP 16 may also include a chargeable power source (not shown) for powering the components of the CAP 16. The RF module 46 may handle radio/wireless communications by the CAP 16. For example, the RF module 46 may allow the CAP to communicate via a wireless communication protocol, preferably Wi-Fi, with the earphones 14 or the wireless access point 24. The memory units 42, 44 may store software instructions for execution by the processor 40 that control the function and operation of the CAP 16. In addition, in various embodiments, the earphones 14 and CAP 16 are part of a conjoined assembly, such that the CAP 16 is configured at manufacture to know the identifiers for the earphones 14. That is, the non-volatile memory 44 may store addresses (e.g., IP addresses) for the earphones 14.

In various embodiments, in order to initially operate the earphones 14 (e.g., "out of the box"), the CAP 16 may be plugged into the desired media device (e.g., the DAP 20 or the computer 22) as described above, which may power the CAP 16 and cause the CAP 16 to transmit (or stream) wirelessly the content output by the media device, which can be received (via the ad hoc wireless communication link 18) and played by the earphones 14 (assuming the earphones 14 are turned on), since the CAP 16 is initially configured to store the addresses for the earphones 14, as described above.

Figure 3:
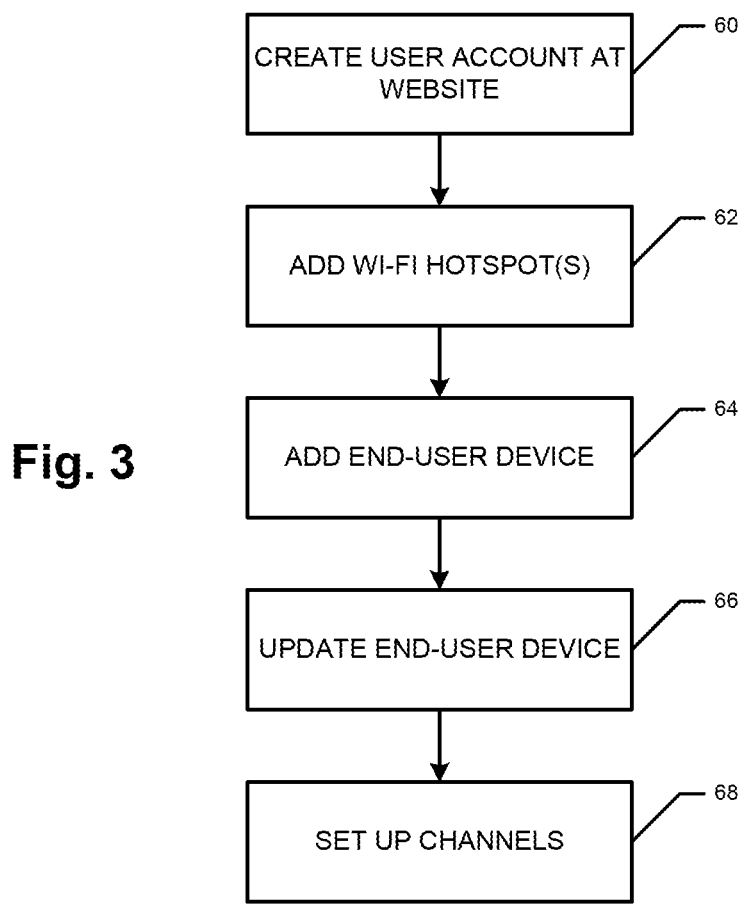
FIG. 3 is a flow chart depicting a process of a system according to various embodiments of the present invention.

As described above, the earphones 14 can, when properly configured, also receive wireless content via infrastructure networks. FIG. 3 is a flow chart of a process for setting up and customizing the channels and streams for the earphones 14, including adding and managing wireless networks (e.g., Wi-Fi hotspots) according to various embodiments. At step 60, the user (e.g., a user of the earphones 14), using the Internet-enabled computer 22 with a browser, logs into a website associated with the earphones 14, hosted by the remote server(s) 30, and sets up an account (if the user does not already have one). At the website the user can, for example, add Wi-Fi hotspots and specify content channels (e.g., Internet radio stations or other servers connected to the Internet that serve content). To add a Wi-Fi hotspot at step 62, the user may click (or otherwise activate) a link on the website that indicates a desire to add a Wi-Fi hotspot. In various embodiments, a JAVA applet from the website may be used by the computer 22 to search for nearby Wi-Fi hotspots, which, upon detection, may be displayed for the user on the website. The user may then click on (or otherwise select) the desired Wi-Fi hotspot to add. If applicable, the website may then prompt the user to enter a password and/or encryption type (e.g., WPA or WPA2) for the selected Wi-Fi hotspot. The SSID, password, and encryption type for the Wi-Fi hotspot is stored for the user's account by the remote server(s) 30. This process could be repeated as necessary to add as many Wi-Fi hotspots as desired by the user.

Next, at step 64, a user device, e.g., the earphone set 12, may be added to the user's account. The user may do this, according to various embodiments, by plugging the CAP 16 into the computer 22. Using a JAVA applet, for example, the IDs for the CAP 16, as well as the IDs for the earphones 14, stored in the non-volatile memory 44 of the CAP 16, are uploaded to the remote server(s) 30 and stored at the remote server(s) 30 as part of the user's account information. Next, at step 66, the user may update the earphones 14 with the Wi-Fi hotspot credentials (e.g., SSID, password if one is used for the hotspot, and/or encryption type). The user may do this by clicking on or otherwise selecting a link on the website to update the earphones 14. Upon clicking the link, the CAP 16 transmits the credentials (e.g., SSID, password, encryption type) for each of the added Wi-Fi hotspots to the earphones 14, via the ad hoc wireless communication link 18. This process allows the earphones 14 to be configured for infrastructure network (and Internet) access without having to physically connect the earphones 14 to the computer 22 to configure them and without having an existing, different infrastructure network that the earphones 14 need to connect to.

The user may also set up channels for the earphones 14 at step 68 through the website. The user may do this by clicking on or otherwise selecting a link or option provided by the website to add channels. The channels may be digital content streams, such as digital audio. The remote server(s) 30 may host a number of such content streams that the user could select via the website. These selections may be stored by the remote server(s) 30 as part of the user's account information. Also, the user could enter an address for a channel(s), associated with another server(s) connected to the network 28, such as the URL for channel's server. These addresses may also be stored by the remote server(s) 30 as part of the user's account information.

The earphones 14 may have one or more multi-function user controls (e.g., buttons, touch interfaces, etc.) and indicators (e.g., LEDs) that allow the user to select and transition through various modes of operation. For example, using the user control(s) of the earphones 14, the user could select an ad hoc mode, whereby the earphones stream and play content from the CAP 16 (and hence the device to which the CAP 16 is connected, such as the DAP 20 or the computer 22). Also, the user could select the infrastructure (e.g., Wi-Fi) mode using the user control(s) in order to stream content via Wi-Fi hotspot. The user may also cycle through or otherwise select the desired channel (stored in step 68) using the user-control.

It should be noted that the some steps of FIG. 3 could be performed in different orders than as shown in FIG. 3. For example, the user's channels could be set up before the Wi-Fi hotspots are added or before the user's earphones 14 are added. However, the earphones 14 could not be updated with the Wi-Fi hotspot credentials (step 66) until the Wi-Fi hotspot(s) and earphones are added (steps 62 and 64).

Figure 4:
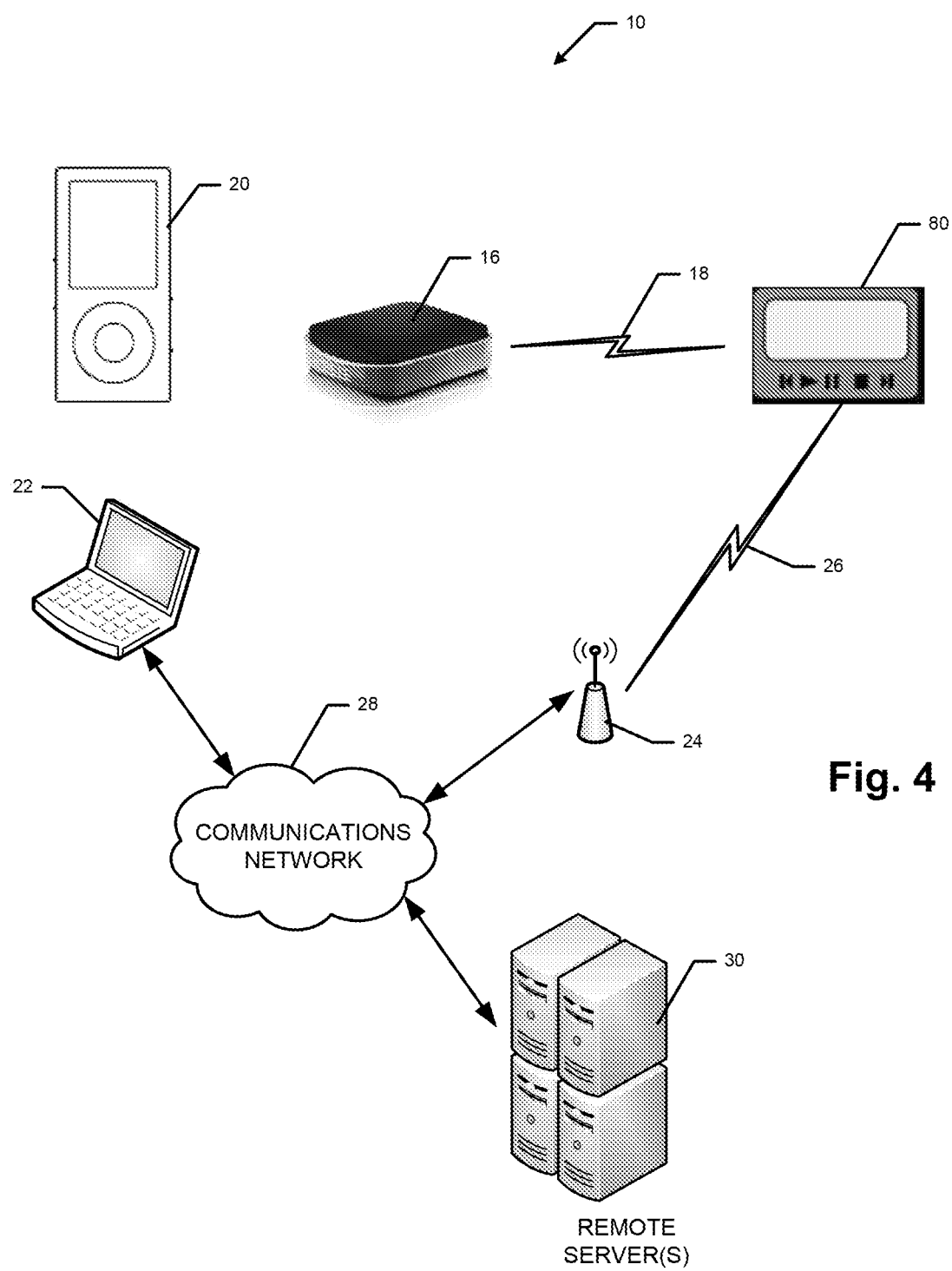

Although the above embodiments were described in the context of wireless earphones for receiving and playing digital audio content, in other embodiments different types of the digital content could be streamed to the wireless device in a similar manner. For example, instead of earphones, a video player 80, as shown in FIG. 4 could be used instead. The video player 80 may be any video player capable of receiving and playing received digital video content, such as MPEG video, for example. The video player 80 may stream the video content from the CAP 16 (and hence the media source connected to the CAP 16) via the ad hoc wireless communication link 18 or via the infrastructure wireless communication link 26, as described above. Also, the video player 80 could be configured with the Wi-Fi hotspot credentials as described above in connection with FIG. 3.

Figure 5:
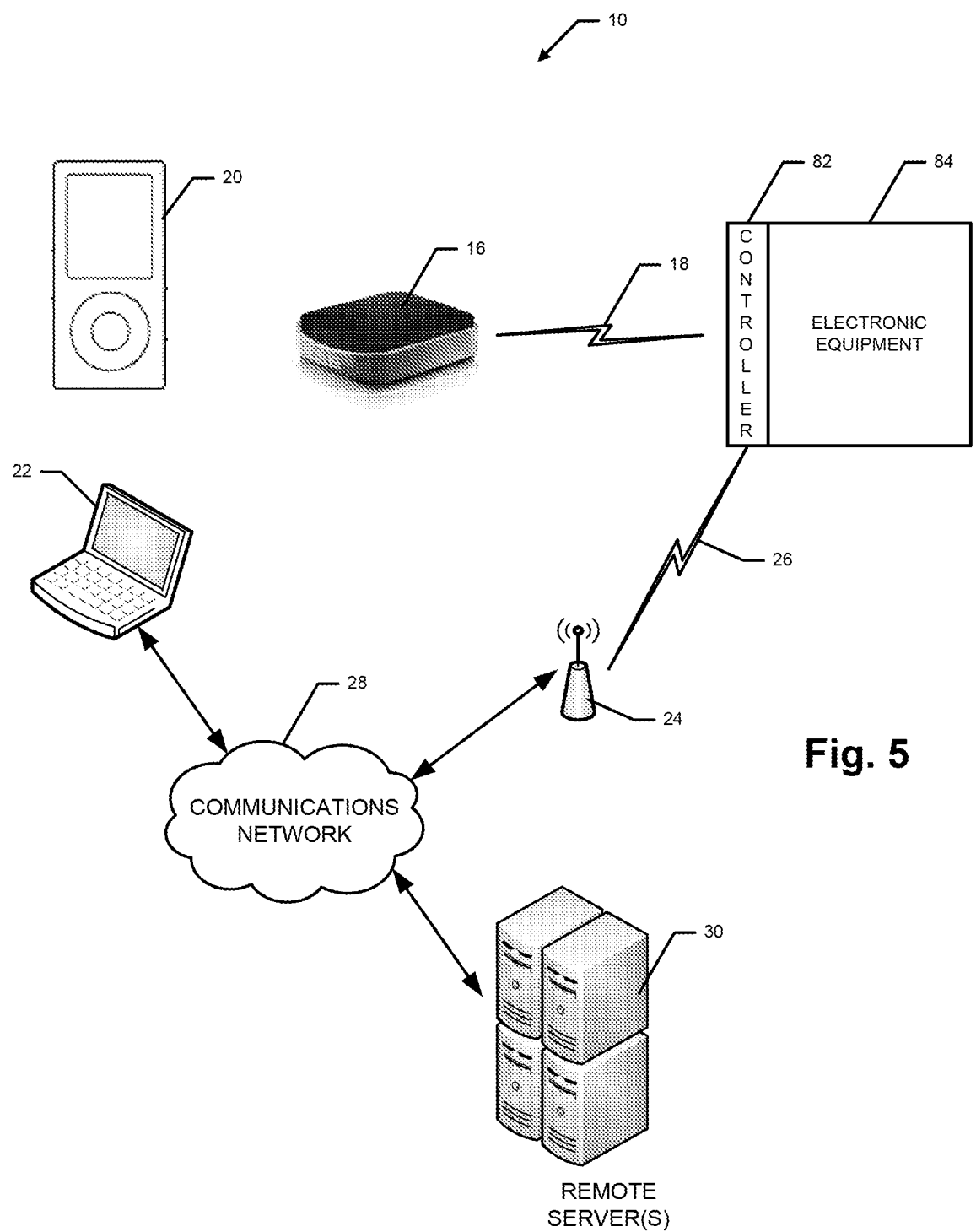

Similarly, as shown in FIG. 5, the wireless device could be a controller 82 that controls the operation and/or function of electronic equipment 84, such as lighting system(s), camera(s), manufacturing equipment, medical device(s), gaming systems, or any other suitable controllable electronic equipment. The controller 82 may receive control data via either the ad hoc or infrastructure wireless networks, depending on which mode the controller 82 is in. As described above, the controller 82 may be configured to connect to the infrastructure wireless network 26 by receiving the credential data for the infrastructure wireless network 26 via the ad hoc wireless network 18.

In one general aspect, the present invention is directed to a system that comprises: the wireless device configured to receive data wirelessly; a content access point that communicates with the wireless device via an ad hoc wireless network; a computer that is connectable to the content access point; and a remote server in communication with the computer via a communications network. The remote server hosts a website accessible by the computer. The website permits a user of the wireless device to input via the computer credential data for at least one infrastructure wireless network, and the remote server stores the credential data for the at least one infrastructure wireless network. Also, the content access point transmits the credential data for the at least one infrastructure wireless network to the wireless device via the ad hoc wireless network, such that, upon receipt of the credential data for the at least one infrastructure wireless network, the wireless device is configured to connect to the at least one infrastructure wireless network.

In various implementations, the wireless device comprises a wireless media player, such as an audio player or a video player. The wireless media player may be configured to receive and play digital media data received via the ad hoc wireless network when in a first mode (an ad hoc mode), and is configured to receive and play digital media data received via the infrastructure wireless network when in a second mode (an infrastructure mode). In other embodiments, the wireless device may comprise a wireless controller that controls electronic equipment. The wireless controller may be configured to receive digital control data received via the ad hoc wireless network when in a first mode (an ad hoc mode), and is configured to receive digital control data received via the infrastructure wireless network when in a second mode (an infrastructure mode). In various embodiments, the ad hoc wireless network comprises an ad hoc Wi-Fi network, and the infrastructure wireless network comprises an infrastructure Wi-Fi network. The credential data for the at least one infrastructure wireless network may comprise: an identifier for the at least one infrastructure wireless network; a password for the at least one infrastructure wireless network; and/or encryption type data for the at least one infrastructure wireless network.

It will be apparent to one of ordinary skill in the art that at least some of the embodiments described herein may be implemented in many different embodiments of software, firmware, and/or hardware. The software and firmware code may be executed by a processor circuit or any other similar computing device. The software code or specialized control hardware that may be used to implement embodiments is not limiting. For example, embodiments described herein may be implemented in computer software using any suitable computer software language type, using, for example, conventional or object-oriented techniques. Such software may be stored on any type of suitable computer-readable medium or media, such as, for example, a magnetic or optical storage medium. The operation and behavior of the embodiments may be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Moreover, the processes associated with the present embodiments may be executed by programmable equipment, such as computers or computer systems and/or processors. Software that may cause programmable equipment to execute processes may be stored in any storage device, such as, for example, a computer system (nonvolatile) memory, an optical disk, magnetic tape, or magnetic disk. Furthermore, at least some of the processes may be programmed when the computer system is manufactured or stored on various types of computer-readable media.

It can also be appreciated that certain process aspects described herein may be performed using instructions stored on a computer-readable medium or media that direct a computer system to perform the process steps. A computer-readable medium may include, for example, memory devices such as diskettes, compact discs (CDs), digital versatile discs (DVDs), optical disk drives, or hard disk drives. A computer-readable medium may also include memory storage that is physical, virtual, permanent, temporary, semipermanent, and/or semitemporary.

A "computer," "computer system," "host," "server," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software modules or engines used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable media. The software modules and engines described herein can be executed by the processor (or processors as the case may be) of the computer devices that access the memory storing the modules.

In various embodiments disclosed herein, a single component may be replaced by multiple components and multiple components may be replaced by a single component to perform a given function or functions. Except where such substitution would not be operative, such substitution is within the intended scope of the embodiments. Any servers described herein, for example, may be replaced by a "server farm" or other grouping of networked servers (such as server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand and/or providing backup contingency in the event of component failure or reduction in operability.

The computer systems may comprise one or more processors in communication with memory (e.g., RAM or ROM) via one or more data buses. The data buses may carry electrical signals between the processor(s) and the memory. The processor and the memory may comprise electrical circuits that conduct electrical current. Charge states of various components of the circuits, such as solid state transistors of the processor(s) and/or memory circuit(s), may change during operation of the circuits.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

The invention claimed is:

1. A system comprising for configuring a wireless audio output device of a user, the system comprising:
    a wireless access point;
    a remote digital media content source;
    a host server for receiving and storing, a content streaming preference selection from the user, wherein the content streaming preference selection comprises a content streaming preference of the user identifying the remote digital media content source;
    the wireless audio output device of the user, wherein the wireless audio output device comprises multiple acoustic transducers; and
    a mobile computing device in communication with the wireless audio output device via an ad hoc wireless communication link,
    wherein:
        the mobile computing device is configured to transmit to the wireless audio output device, wirelessly via the ad hoc wireless communication link between the wireless audio output and the mobile computer device, credential data for an infrastructure wireless network pre-specified by the user, wherein the credential data comprises an identifier for the infrastructure wireless network and a password for the infrastructure wireless network; and
        the wireless audio output device is configured to, upon receiving, from the mobile computing device, the credential data for the infrastructure wireless network pre-specified by the user:
            connect to the wireless access point via the infrastructure wireless network;
            receive the content streaming preference from the host server via the infrastructure network; and
            stream digital media content from the remote digital media content source according to the content streaming preference.

2. The system of claim 1, wherein the content streaming preference includes credentials for accessing the remote digital media content source.

3. The system of claim 1, wherein the wireless audio output device is further configured to play audio streamed from the mobile computing device via the infrastructure wireless network without having to be physically plugged into the mobile computing device.

4. The system of claim 1, wherein the wireless audio output device is further configured to play audio streamed from the mobile computing device via the ad hoc wireless communication link without having to be physically plugged into the mobile computing device.

5. The system of claim 1, wherein the wireless audio output device further comprises:
    a microphone.

6. The system of claim 1, wherein the mobile computing device comprises a smartphone.

7. The system of claim 1, wherein the ad hoc wireless communication link includes one or both of an ad hoc WiFi wireless network and an ad hoc Bluetooth® communication link.

8. The system of claim 1, wherein the infrastructure wireless network includes a WiFi network.

9. The system of claim 1, wherein the multiple acoustic transducers comprise:
    a first acoustic transducer for transmitting higher audible frequencies; and
    a second acoustic transducer for transmitting lower audible frequencies.

10. The system of claim 1, wherein the wireless audio output device comprises one or more of a pair of earphones, an acoustic speaker, a wireless video player, a wireless audio player, a gaming system, and a medical device.

11. The system of claim 1, wherein the host server additionally stores the credential data for the infrastructure wireless network.

12. The system of claim 1, the host server is for receiving the content streaming preference selection from the user via a website.

13. A method for configuring a wireless audio output device of a user, the method comprising:
    pre-specifying, by the user, an infrastructure wireless network, wherein pre-specifying the infrastructure wireless network comprises storing, by the user, at a remote host server, credential data for the infrastructure wireless network, wherein the credential data comprises an identifier for the infrastructure wireless network and a password for the infrastructure wireless network;
    storing, by the remote host server, a content streaming preference selection from the user, wherein the content streaming preference selection comprises a content streaming preference of the user identifying a remote digital media content source;
    connecting, by the wireless audio output device, to a mobile computing device via an ad hoc wireless communication link;

receiving, by the wireless audio output device from the mobile computing device, the identifier for the infrastructure wireless network and the password for the infrastructure wireless network pre-specified by the user;

connecting, by the wireless audio output device, to a wireless access point via the infrastructure wireless network using the credential data;

receiving, by the wireless audio output device from a host server, the content streaming preference identifying the remote digital media content source; and streaming digital media content by the wireless audio output device from the remote digital media content source according to the content streaming preference.

14. The method of claim 13, wherein the content streaming preference includes credentials for accessing the remote digital media content source.

15. The method of claim 13, further comprising:

playing audio streamed from the mobile computing device via the infrastructure wireless network without having to be physically plugged into the mobile computing device.

16. The method of claim 13, further comprising:

playing audio streamed from the mobile computing device via the ad hoc wireless communication link without having to be physically plugged into the mobile computing device.

17. The method of claim 13, further comprising:

picking up, via a microphone, audible audio signals.

18. The method of claim 13, wherein the mobile computing device comprises a smartphone.

19. The method of claim 13, wherein the ad hoc wireless communication link includes one or both of an ad hoc WiFi wireless network and an ad hoc Bluetooth® communication link, and wherein the infrastructure wireless network includes a WiFi network.

20. The method of claim 13, further comprising, storing additionally, by the remote host server, the credential data for the infrastructure wireless network.

* * * * *